United States Patent Office 3,156,673
Patented Nov. 10, 1964

3,156,673
NEW POLYMERIC MATERIALS OF BORONATE-POLYISOCYANATE REACTION PRODUCTS
William Randall Bamford, West Kilbride, Scotland, assignor to Imperial Chemical Industries Limited, London, England, a corporation of Great Britain
No Drawing. Filed Aug. 23, 1961, Ser. No. 133,292
Claims priority, application Great Britain, Sept. 1, 1960, 30,211/60
10 Claims. (Cl. 260—77.5)

This invention relates to new and useful polymeric materials and more particularly to such polymeric materials containing boron.

A number of polymeric materials are known or have been proposed which contain boron in the polymeric chain. Difficulties have, however, been experienced in obtaining boron-containing polymers which are stable and resist oxidising and hydrolytic conditions. It is also well known that linear polyurethanes are formed from di-isocyanates and di-isothiocyanates on reaction with suitable diols. These classes of polymers have a wide variety of applications.

An object of the present invention is the provision of new and useful boron containing polymeric materials.

According to the present invention polymeric material is obtained by a process in which a di-isocyanate is caused to react with a diol having the general formula:

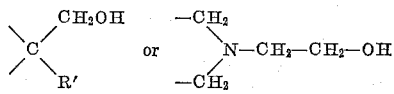

where R is a polymethylene group having from 4 to 10 carbon atoms or a p-phenylene group and Z is a divalent group having the general formula

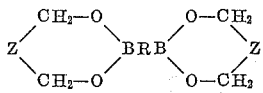 or $\diagdown$N—CH$_2$—CH$_2$—OH

R' being an alkyl or aryl group or an alkyl or aryl group having a halogen or an alkoxy substituent.

The diols used in the process of our invention are obtained by causing a diboronic acid selected from p-phenylenediboronic acid and the polymethylenediboronic acids in which the methylene chain consists of from 4 to 10 inclusive methylene groups to react with a suitable trihydroxy compound. The preparation of these diols is more fully described in U.S. Patent No. 3,106,573. Suitable diols for use in the process of our invention include, for example bis(1:1:1-trimethylolpropane)p-phenylenediboronate, bis(1:1:1-trimethylolethane)p-phenylenediboronate, bis(triethanolamine)tetramethylenediboronate and the like.

A wide variety of di-isocyanates may be used in the process of our invention. Suitable di-isocyanates include, for example 2:4-di-isocyanatotoluene, 2:6-di-isocyanatotoluene, 4:4'- and 2:4-di-isocyanatodiphenylmethane and 1:6-hexamethylenedi-isocyanate.

The process of my invention may be carried out by heating together the di-isocyanate with the diol in a suitable solvent at temperatures up to the region of 200° C. It is, however, normally preferred to carry out the reaction at a temperature of 80 to 150° C. The reaction may, if desired, be carried out under pressure but no advantage is obtained thereby and it is normally preferred to carry out the reaction at atmospheric pressure. Suitable solvents which may be used include hydrocarbons, chlorinated hydrocarbons, ethers and the like. The choice of solvent is groverned by the solubility of the diol which should dissolve in it and by the necessity for it to be inert towards the isocyanate.

The polymers produced by the process of my invention may be used in a wide variety of applications. Thus all of these have good adhesive properties coupled with film-forming and fibre-forming properties and are not affected by atmospheric moisture unlike the majority of known boron ester compositions. Moreover, the presence of boron in the substances confers some degree of resistance to heat and bacteria, and provides a small source for neutron absorption.

Our invention is further illustrated by the following examples in which all parts are by weight.

Example 1

27.7 parts of bis(1:1:1-trimethylolpropane)p-phenylenediboronate were dissolved in 580 parts of boiling toluene in a reaction vessel provided with an atmosphere of nitrogen. 19.1 parts of 4:4'-di-isocyanatodiphenylmethane dissolved in 180 parts of xylene were added to the boiling solution over a period of 4 hours. The mixture was heated under reflux for a further half-hour after which the hot supernatant liquor was decanted. The solid residue obtained was dissolved in dimethylformamide and precipitated by pouring this solution into methanol. The product was recovered by filtration and dried under vacuum to give 44.3 parts of a solid polymer softening at 240° C. This polymer could be drawn into fibres, formed a good adhesive bond between glass, brass and nickel surfaces and gave a hard surface coating on glass, wood and metals. It was unaffected by exposure to a moist atmosphere for two months.

Example 2

The procedure of Example 1 was repeated with the di-isocyanatodiphenylmethane being replaced by 13.4 parts of 2:4 di-isocyanatotoluene. 32.4 parts of a polymer softening at 190–200° C. were obtained. The properties of this material were similar to those of the product of Example 1.

Example 3

28.4 parts of bis(triethanolamine)tetramethylenediboronate were reacted with 19.1 parts of 4:4'-di-isocyanatodiphenylmethane in the manner described in Example 1. There was obtained 29.4 parts of a polymer which softened at 200 to 210° C. This polymer had properties similar to the products of Examples 1 and 2.

Example 4

The procedure of Example 1 was repeated with the bis(1:1:1 - trimethylolpropane)p - phenylenediboronate being replaced by 25.6 parts of bis(1:1:1-trimethylolethane)p-phenylenediboronate and 0.2 part of triethylamine added to the reaction mixture as a catalyst. 43.1 parts of a polymer softening at 235–240° C. were obtained, having properties similar to those of the product of Example 1.

What I claim is:

1. A process for the production of polymeric materials which comprises the reaction of an organic di-isocyanate with a diol having the general formula:

where R is selected from the group consisting of a polymethylene group having from 4 to 10 carbon atoms and a p-phenylene group, and Z is a divalent group having a general formula selected from the group consisting of

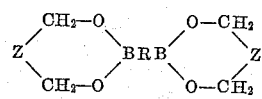

or

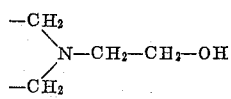

R' being an alkyl group.

2. A process as claimed in claim 1 wherein the organic di-isocyanate and the diol are heated together in a solvent at temperatures in the range 80 to 150° C.

3. A process as claimed in claim 1 wherein the organic di-isocyanate is 2:4-di-isocyanatotoluene.

4. A process as claimed in claim 1 wherein the organic di-isocyanate is 2:6-di-isocyanatotoluene.

5. A process as claimed in claim 1 wherein the organic di-isocyanate is 4:4′-di-isocyanatodiphenylmethane.

6. A process as claimed in claim 1 wherein the organic di-isocyanate is 2:4′-di-isocyanatodiphenylmethane.

7. A process as claimed in claim 1 wherein the organic di-isocyanate is 1:6-hexamethylenedi-isocyanate.

8. A process as claimed in claim 1 wherein the diol is bis(1:1:1-trimethylolpropane)p-phenylenediboronate.

9. A process as claimed in claim 1 wherein the diol is bis(1:1:1-trimethylolethane)p-phenylenediboronate.

10. A process as claimed in claim 1 wherein the diol is bis(triethanolamine)tetramethylenediboronate.

References Cited by the Examiner

UNITED STATES PATENTS 3,053,777  9/62  Goldschmid _____ 260—2

LEON J. BERCOVITZ, *Primary Examiner.*

H. N. BURSTEIN, DONALD E. CZAJA, *Examiners.*